United States Patent
Patel et al.

(10) Patent No.: US 9,137,267 B2
(45) Date of Patent: Sep. 15, 2015

(54) SECURE TRANSMISSION OF MEDIA DURING A COMMUNICATION SESSION

(71) Applicant: VONAGE NETWORK LLC, Holmdel, NJ (US)

(72) Inventors: Vishal Patel, New Brunswick, NJ (US); David Michael Workman, Eatontown, NJ (US)

(73) Assignee: VONAGE NETWORK LLC, Holmdel, NJ (US)

( * ) Notice: Subject to any disclaimer, the term of this patent is extended or adjusted under 35 U.S.C. 154(b) by 0 days.

(21) Appl. No.: 13/827,521

(22) Filed: Mar. 14, 2013

(65) Prior Publication Data

US 2014/0280982 A1    Sep. 18, 2014

(51) Int. Cl.
| | |
|---|---|
| G06F 15/16 | (2006.01) |
| H04L 29/06 | (2006.01) |
| H04W 12/02 | (2009.01) |
| H04W 80/10 | (2009.01) |
| H04M 7/00 | (2006.01) |

(52) U.S. Cl.
CPC ........... H04L 65/1006 (2013.01); H04W 12/02 (2013.01); H04W 80/10 (2013.01); *H04L 63/0428* (2013.01); *H04L 63/108* (2013.01); *H04M 7/006* (2013.01)

(58) Field of Classification Search
CPC ........... H04L 65/1006; H04L 63/0428; H04L 63/108; H04M 7/006; H04W 12/02; H04W 80/10
USPC ......................................................... 704/227
See application file for complete search history.

(56) References Cited

U.S. PATENT DOCUMENTS

| | | | |
|---|---|---|---|
| 6,865,681 B2 | 3/2005 | Nuutinen | |
| 7,730,309 B2 | 6/2010 | Zimmermann | |
| 8,256,664 B1 | 9/2012 | Balfanz et al. | |
| 2006/0019698 A1 | 1/2006 | Ahya et al. | |
| 2007/0022163 A1* | 1/2007 | Wormald et al. | 709/206 |
| 2007/0150723 A1* | 6/2007 | Estable et al. | 713/155 |
| 2007/0157045 A1* | 7/2007 | Gu et al. | 713/323 |
| 2008/0125080 A1 | 5/2008 | Phillips | |
| 2010/0322259 A1* | 12/2010 | Garg et al. | 370/401 |
| 2011/0035290 A1 | 2/2011 | Mortillaro et al. | |

(Continued)

FOREIGN PATENT DOCUMENTS

WO    WO 2005/109923 A1    11/2005

OTHER PUBLICATIONS

P Zimmermann et al., "ZRTP: Media Path Key Agreement for Unicast Secure RTP", Internet Engineering Task Force (IETF), ISSN: 2070-1721, 115 pages, Apr. 2011.

(Continued)

*Primary Examiner* — Phuoc Nguyen
(74) *Attorney, Agent, or Firm* — Moser Taboada; Joseph Pagnotta

(57) ABSTRACT

Methods for secure transmission of data during a communication session are provided herein. In some embodiments, the method includes establishing a secure voice communication session between a first electronic device and second electronic device in a communications network, and sending secure data over the established voice communication session using information associated with the established voice communication session.

18 Claims, 6 Drawing Sheets

(56) References Cited

U.S. PATENT DOCUMENTS

| | | | |
|---|---|---|---|
| 2011/0271113 A1 | 11/2011 | Venters, III et al. | |
| 2012/0040644 A1* | 2/2012 | Naik et al. | 455/412.1 |
| 2012/0254325 A1 | 10/2012 | Majeti et al. | |
| 2012/0290420 A1 | 11/2012 | Close | |
| 2013/0136260 A1* | 5/2013 | Park et al. | 380/270 |
| 2013/0212646 A1* | 8/2013 | McFarland et al. | 726/4 |

OTHER PUBLICATIONS

J. Rosenberg et al., "SIP: Session Initiation Protocol", Network Working Group, 269 pages, Jun. 2002.

M. Baugher et al., "The Secure Real-Time Transport Protocol (SRTP)" Network Working Group, 56 pages, Mar. 2004.

International Search Report and Written Opinion mailed Jul. 4, 2014 for Application No. PCT/US2014/022581, 7 pages.

* cited by examiner

SECURE TRANSMISSION OF MEDIA DURING A COMMUNICATION SESSION

BACKGROUND OF THE INVENTION

1. Field of the Invention

Embodiments consistent with the present invention generally relate to methods, apparatus, and systems for secure transmission of media during a communication session.

2. Description of the Related Art

Instances may arise when using mobile devices where sending secure data to another device is desired. Conventional systems for forming secure voice and data connections require active steps by at least one user. Such steps include the use of additional hardware, entering of passwords/codes, the use of public key/private key system, and the like. The additional steps to secure data communications may be cumbersome to set up and may need to be established between two users in advance (e.g., the use of public key/private key system).

Accordingly, the inventors have provided methods for secure transmission of media during a communication session.

SUMMARY OF THE INVENTION

Methods for secure transmission of data during a communication session are provided herein. In some embodiments, the method includes establishing a secure voice communication session between a first electronic device and second electronic device in a communications network, and sending secure data over the established voice communication session using information associated with the established voice communication session.

In some embodiments, a method for secure transmission of media during a communication session includes establishing a secure voice communication session between a first electronic device and second electronic device in a secure voice channel of a first communications network, establishing a secure data communication channel between the first electronic device and the second electronic device using information associated with the established voice communication session, and sending secure data over the established secure data communication channel.

In some embodiments, a method for securely and automatically deleting data transmitted between a first electronic device and a second electronic device includes establishing a voice communication session between a first electronic device and second electronic device, establishing a data communication channel between the first electronic device and the second electronic device using information associated with the established voice communication session, transmitting data over the established data communication channel, wherein the data includes a time period for expiration to automatically delete the transmitted data, and deleting the transmitted data after expiration of the time period.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
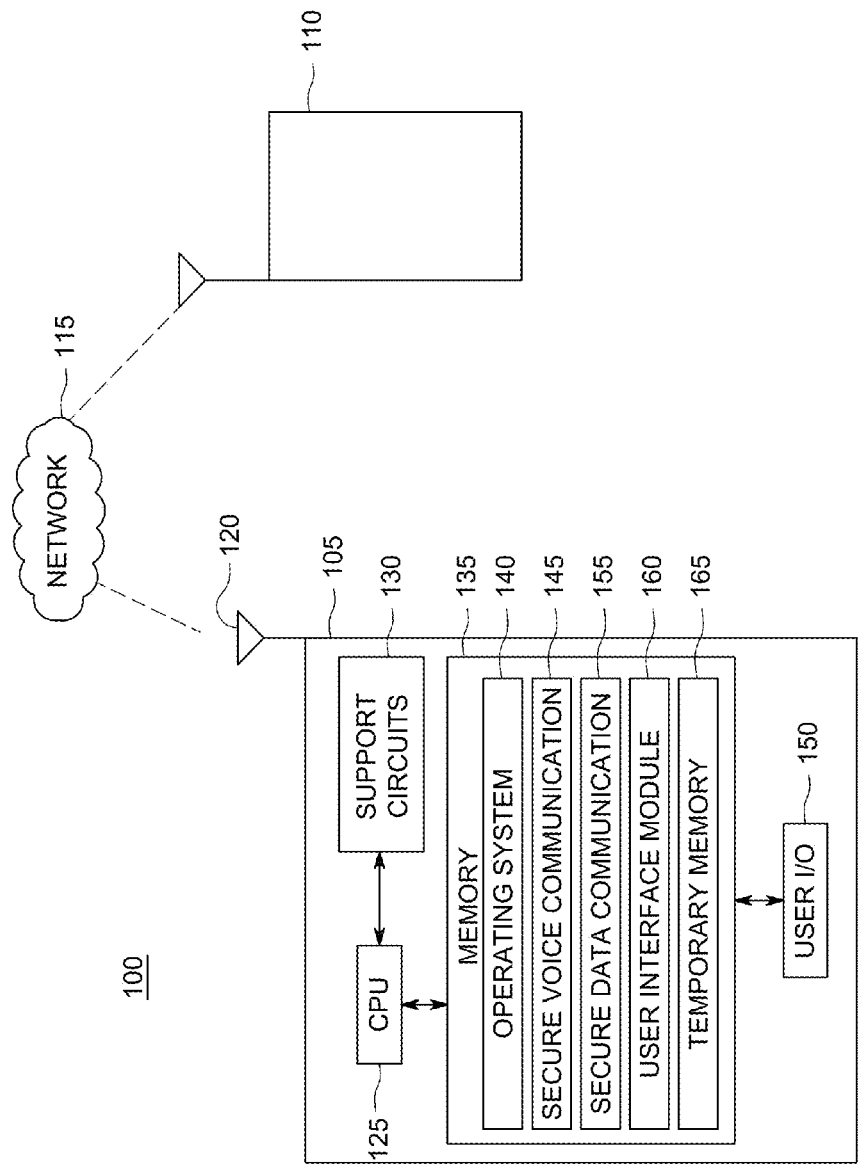
FIG. 1 depicts a communications system between a first terminal and a second terminal in accordance with one or more exemplary embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

In embodiments consistent with the present invention, data sessions for transmitting data between users may be established using an existing voice call channel already established between users. For example, a call leg connecting user A (on a first device) and user B (on a second device, different from the first) would be established. The first and second devices operate as media relay devices and are aware that the first device has a voice communication channel established with the second device. The voice communication channel is achieved using an application or method for setting up a call session (e.g. SIP). Media relay in some embodiments refers to handling of the actual media using real-time transfer protocol (RTP) or secure real-time transfer protocol (SRTP). The information from the established voice communication connection between the first device and second device is used to authenticate users and allow data transfer to user B (e.g., using a single swipe/click to send user B a picture, link, video, text message, and the like). This would make it easier to share data between users. SRTP defines a profile of RTP (Real-time Transport Protocol), intended to provide encryption, message authentication and integrity, and replay protection to the RTP data in both unicast and multicast applications, the details of which are disclosed in IETF RFC 3711 herein incorporated by reference.

In some embodiments, the established voice communication connection between the first device and the second device may be established as a secure voice communication session. Embodiments of the present invention may advantageously use the secure voice communication connection to send secure data between the first device and the second device with minimal additional actions required by the users. The secure transmission of data may be in-band (i.e., sending of data within the same band or channel used for voice) or may be out-of-band (on a separate channel). In addition, embodiments of the present invention described below include the ability to set a time for expiration to automatically delete the data transferred between the first device and the second device (e.g., at the end of the voice call, or at a certain time after the voice call has ended). Various embodiments of an apparatus and method for secure transmission of media during a communication session are provided below. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a mobile communications system 100 between a first terminal 105 and a second terminal 110. The exemplary mobile communications system 100 comprises a communications network 115, the first terminal 105, and the second terminal 110. The two terminals are wirelessly connected to the communications network 115 that may use SIP, VoIP, and the like to form a voice call session. The communications network 115 may be one or more networks such as Internet Protocol (IP) networks or public switched telephone networks (PSTN) used to connect the first 105 and second terminals (e.g. devices) 110.

In some embodiments a secure connection may be formed using a pre-exchange of keys. For example, using Secure SIP (SIPS)/SRTP to exchange keys via transport layer security (TLS), a certification or authentication between devices may be achieved with public key infrastructure (PKI). In some embodiments, key exchange may be achieved dynamically using ZRTP and SIP-URI addressing scheme to reach key agreement. The communications network 115 allows for wireless mobile devices to exchange data and voice communications. The communications network 115 is capable of processing the sending and receiving of both and voice and data streams between the first terminal 105 and the second terminal 110. The first terminal 105 includes an antenna 120, a CPU 125, support circuits 130, memory 135, and input/output (I/O) interface 150. The support circuits 130 include circuits for interfacing the CPU 125 and memory 140 with the antenna 120 and input/output interface 150. The I/O interface 150 may include a speaker, microphone, camera, touch screen, buttons and the like for a user to interact with the first terminal 110.

SIP (including SIPS) is a is an IETF-defined signaling protocol widely used for controlling communication sessions such as voice and video calls over Internet Protocol (IP) the details of which are disclosed in IETF RFC 3261 herein incorporated by reference. ZRTP is a cryptographic key-agreement protocol to negotiate the keys for encryption between two end points in a Voice over Internet Protocol (VoIP) phone telephony call based on the Real-time Transport Protocol the details of which are disclosed in IETF RFC 6189 herein incorporated by reference. The memory 135 includes an operating system 140, a secure voice communication module 145, a secure data communication module 155, a user interface module 160, and a temporary memory module 165. The operating system 140 controls the interoperability of the support circuits 130, CPU 125, memory 135, and the I/O interface 150. The secure voice communication module 145 includes instructions for forming a secure communications session via encryption such as SIPS, AES, HTTPS, and the like. In some embodiments, the secure voice communication module 145 is responsible for encryption and decryption of voice transmissions between the first terminal 105 and the second terminal 110. In such an embodiment, the network 115 primarily exchanges only encrypted voice transmissions between the terminals (105 and 110).

The user interface module 160 contains instructions for the I/O interface 150 to interact with the operating system 140 such as for a graphical user interface (GUI). The secure data communication module 155 allows sending of specific selected data by each user (e.g. video, text, images, and the like) upon confirmation that the secure voice communication module 145 has formed a secure communications session. The data is transmitted via the same secure voice channel or band and thus operating "in-band". In some embodiments, the data may be transmitted in a different channel or band and thus operate "out-of-band". As will be further discussed below, in some embodiments, the temporary memory portion 165 retains data for only while the voice call session is active. In other embodiments, the temporary memory portion 165 is automatically deleted after a particular time window has elapsed, which may be before, after or co-terminus with the call. The second terminal 110 has substantially similar structure to that of the previously mentioned first terminal.

In some embodiments, the secure data communication module 155 allows sending of specific selected data to another user via a mixed mode communication. In such an embodiment, the first and second terminals (105 and 110) operate across two different networks. For example, the secure voice communication module 145 may establish a secure communications session via cellular communication (CDMA, GSM, 3GPP, etc.). In some embodiments, after a secure voice communication session is established between the first and second terminals (105 and 110), the secure data communication module 155 may transfer selected data via a local shared wireless network (Wi-Fi, WLAN, etc.) as a response to a user input. In this manner, larger data files may be quickly transferred to another device across the local wireless network using the secure communication session as a means for user authentication. Alternative embodiments may forego a local wireless network for a near field communication (NFC). Using NFC, once a secure communication session is confirmed, payment transactions, credit transfers, usage minute transfers, and contact information may be securely transmitted between devices.

Figure 2:
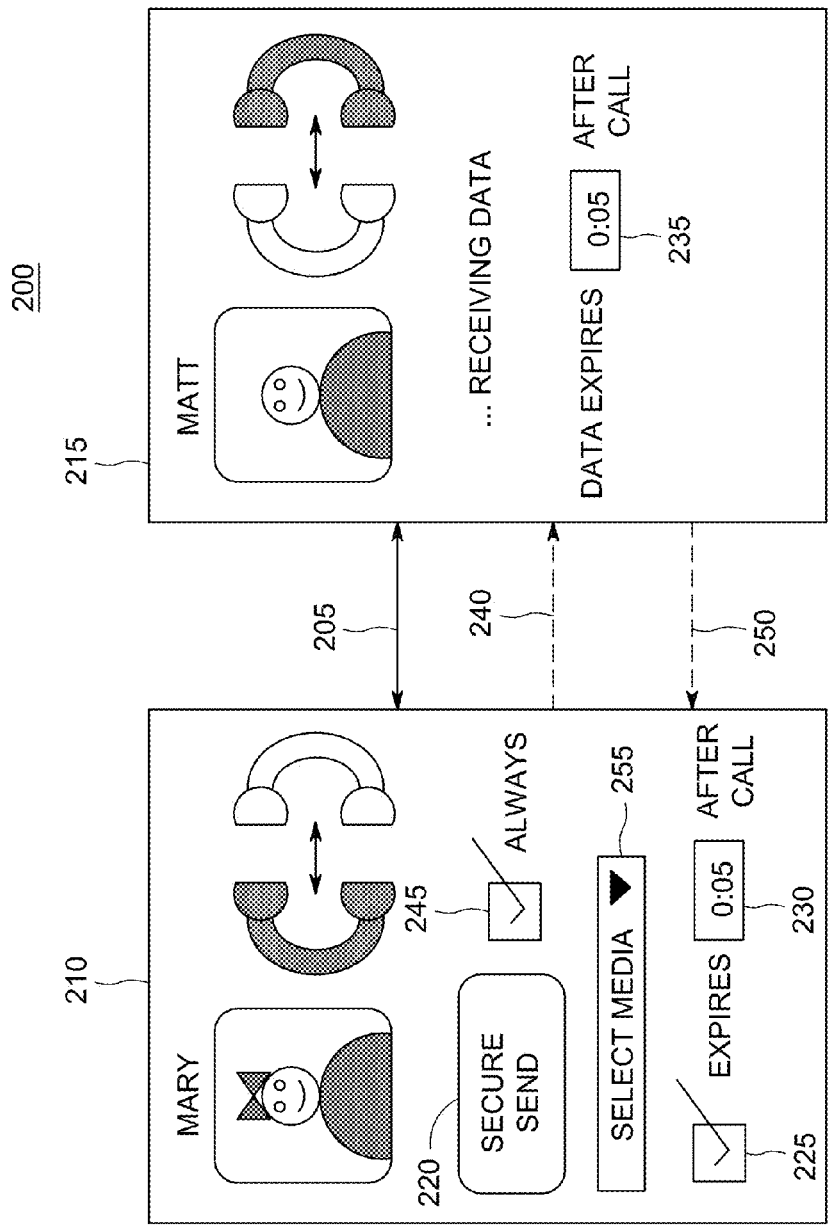
FIG. 2 is an illustration of an exemplary graphical user interface (GUI) in accordance with one or more embodiments of the invention.

FIG. 2 is an illustration of an exemplary graphical user interface (GUI) in accordance with one or more embodiments of the invention. The GUI 200 is used during an exemplary secure call session 205 implemented by the system 100 established in FIG. 1. The GUI 200 is implemented by the first device 105 operated by a first user 210 and the second device 115 operated by a second user 215. The secure call session 205 may be an audio and/or video call. While the secure call session 205 is active, the first user 210 may decide to send secure data 240 to the second user 210 (each using their respective terminals). The first user 210 may select an exemplary "secure send" button 220 to select secure data 240 to send to the second user 215. The data may be media including text, video, images, sounds, and/or internet links selected via an exemplary drop down menu 255.

In some embodiments, the first user 210 may specify a time period 230 before or after initiating sending of the secure data 240 when the secure data 240 will be deleted 225 on the second user's device 110. In some embodiments, data expiration may be controlled within the communication network such that no data is stored on the second device 115. In some embodiments, logic may be built into the client applications on the devices (105 and 115) to enforce a time to live (TTL) of secure data 240.

The secure data 240 is stored in the temporary memory 165 of the second terminal 110 of the second user 215 and deleted once the time period 230 expires. If the first user 210 elects to send data without choosing the "expires" button 225, the sent data will be deemed to be permanent until deleted/modified by the receiving terminal 110. Alternatively, the first user 210 may select a button 245 to always send data in the temporary time period 230 in which secure data 240 will always be temporarily stored in temporary memory 165. Similarly, the second user 215 may select the temporary time period 230 when the second user 215 is sending data 250 to the first user 210. Transfer of data (240 and 250) and the secure call session 205 may occur on a single channel or across multiple channels. In some embodiments, transfer of data (240 and 250) occurs over a network different from the network supporting the secure call session 205.

The time period 230 may also be automatically set. In some embodiments, when the first user 210 sets the time period 230 to "0", for example, the secure data 240 will be deleted as soon as the secure call session 205 ends. Other types of user interface checkboxes, selections, or /inputs other than setting the time period 230 to "0" may be used to implement the same functionality. The second user 215 is then notified of the temporary time period 230. The temporary time period 230 may be a fixed unit (e.g. seconds, minutes, days, etc.) or a specific date and time. In some embodiments, when a time period 230 is set, the second device 115 is prevented from saving the secure data 240 to any portion of memory 135 in the second device 115 and the secure data 240 is temporarily streamed to the second device 115.

In some embodiments, the data is automatically deleted once the secure call session 205 ends. In other embodiments, the time period may not start with the ending of the secure call session 205 but when the data is viewed by the second user 215. In further embodiments, the second user may offer to change the time period 230 window set by the first user 210 such that permission is asked via the GUIs 200 between the two terminals (105 and 115) and such that both users (210 and 215) agree on the new temporary time period 230. In some embodiments, the expiration period 230 may be also applied to unsecure communications sessions.

Figure 3:
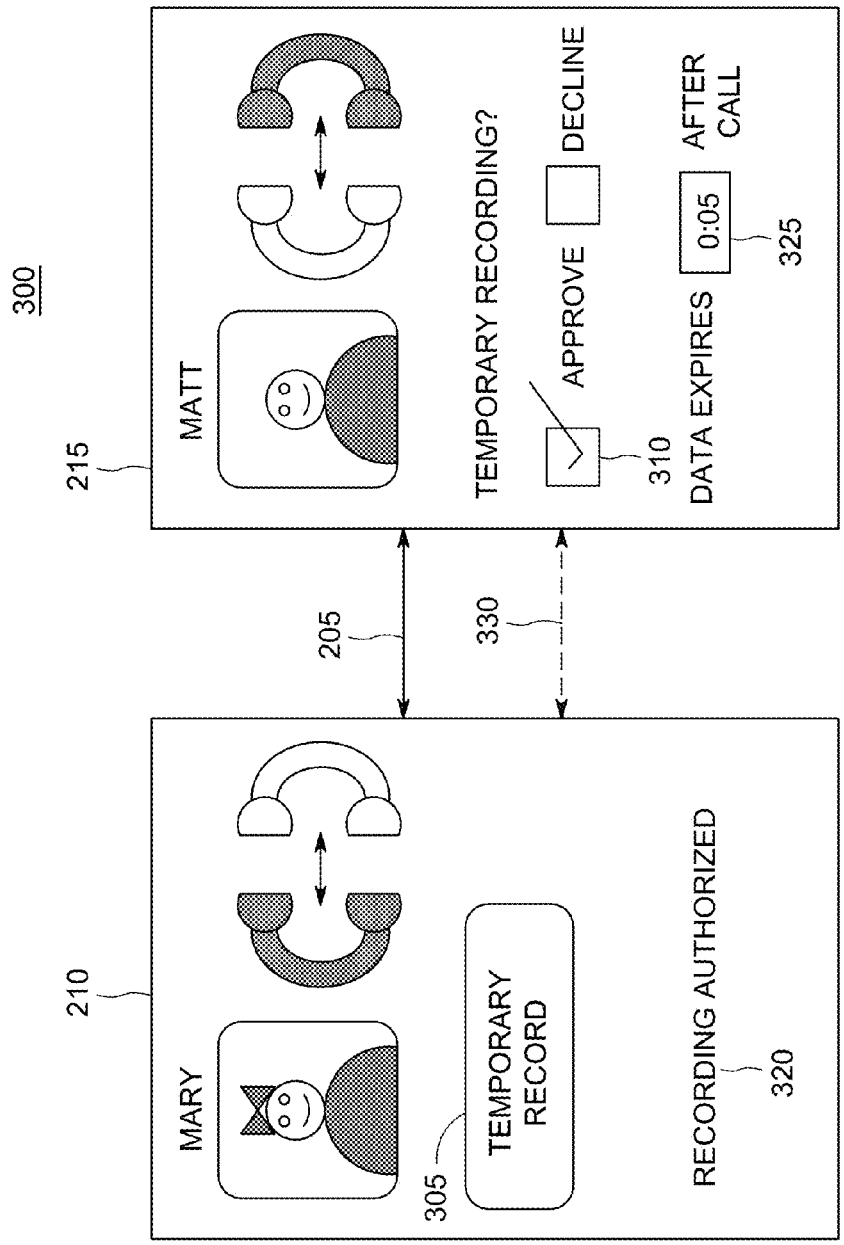
FIG. 3 is an illustration of an exemplary GUI for temporarily recording a session in accordance with one or more embodiments of the invention.

FIG. 3 is an illustration of an exemplary GUI 300 for temporarily recording a session in accordance with one or more embodiments of the invention. FIG. 3 depicts the same/similar secure call session 205 of FIG. 2 wherein one or both of the users desires to record the secure call session 205. In this exemplary embodiment, the first user 210 initiates a temporary recording request 330 by selecting a record request button 305. The request is sent to the second user 215 that selects to approve or decline 310 the request. The second user 215 is able to set an expiration time period 325 or a value may be automatically set. The selection made by the second user 215 is displayed 320 to the first user. Alternatively, the first user 210 may set an expiration time period 325 that the second user 215 may also approve/decline or modify the expiration time period 325. The temporary recording may begin once all parties have agreed to the recording and/or expiration time period 325. In some embodiments, the temporary recording is deleted automatically from temporary memory 165 when the secure call session 205 ends. The temporary time period 325 may be a fixed unit (e.g. seconds, minutes, days, etc.) or a specific date and time.

Figure 4:
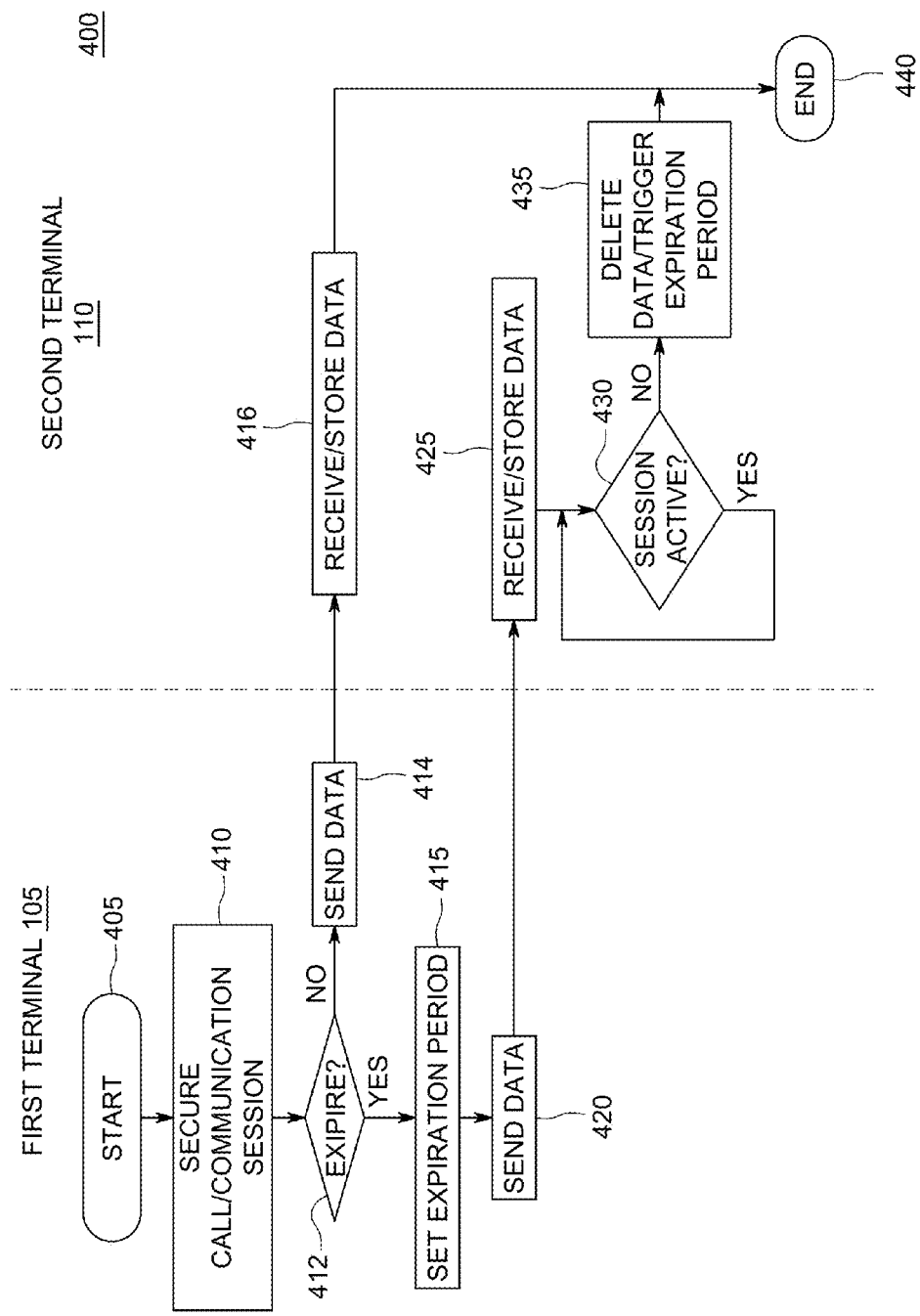
FIG. 4 is a flow diagram of an exemplary pre-authorized temporary storage method in accordance with one or more embodiments of the invention.

FIG. 4 is a flow diagram of an exemplary pre-authorized temporary storage method 400 in accordance with one or more embodiments of the invention implemented by the devices of FIGS. 1 and 2. The method 400 begins at step 405 and continues with step 410 wherein a secure call/communication session 205 is established between the first terminal 105 and the second terminal 110 across the network 115. Next, method 400 determines at step 412 whether the secure data 240 is to expire and if not, the first terminal 105 sends the secure data 240 at step 414 to be received by the second terminal 110 at step 416 and the method 400 ends at step 440.

However, if the secure data 240 is to expire, the first terminal 105 sets an expiration time period 230 associated with secure data 240 at step 415. In some embodiments the expiration time period 230 may be defaulted to delete immediately. Next, at step 420 the secure data 240 is sent to the second terminal across the network 115. The secure data 240 is then received by the second terminal at step 425 and stored in temporary memory 165. The method 400 determines whether the secure call session 205 is still active at step 430. Should the method 400 determine the secure call session 205 is active, the method returns to keep checking the secure call session 205. However, if not active at step 430, the method 400 continues to step 435 wherein the secure data 240 is deleted from the temporary memory 165 on the second terminal. In some embodiments, step 435 may trigger the start of the expiration period 230 as opposed to immediately deleting the secure data 240. The method 400 then ends at step 440.

Figure 5:
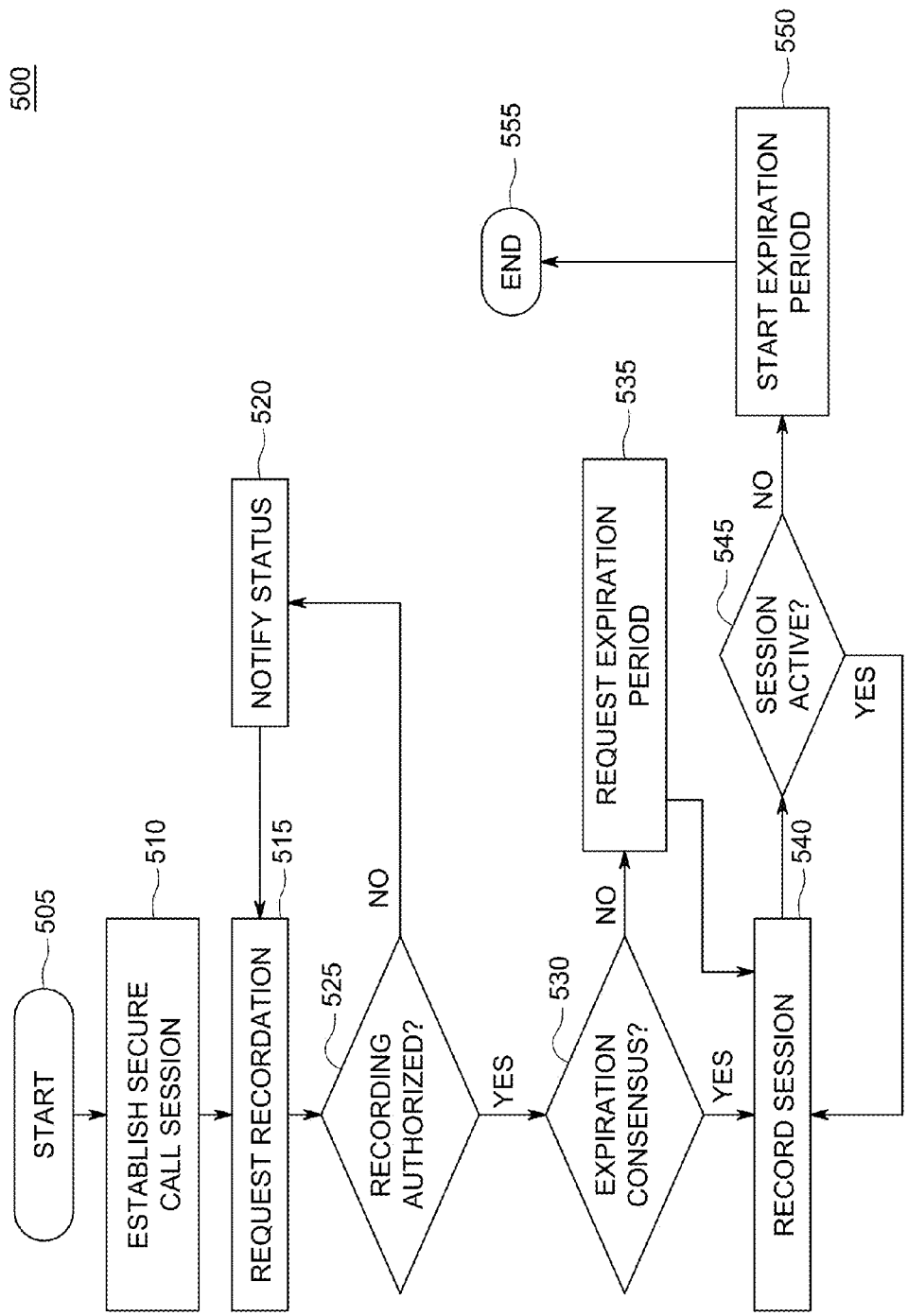
FIG. 5 is a flow diagram of an exemplary recording method in accordance with one or more embodiments of the invention.

FIG. 5 is a flow diagram of an exemplary recording method 500 in accordance with one or more embodiments of the invention and implemented by the devices in FIGS. 1 and 3. The method 500 begins at step 505 and continues with step 510 wherein a secure call session 205 is established between the first terminal 105 and the second terminal 110 across the network 115. In some embodiments the method 500 may be implemented in an unsecure call session.

The method 500 continues to step 515 wherein the first terminal 105 requests permission to temporarily record the secure communications session 205 at step 515. The method 500 then determines whether recording authorization was authorized by all parties at step 525. Should the method 500 determine authorization was not received or declined, the terminals (105 and 110) are notified of such status at step 520 and the method returns to step 510. However, if authorization is received the method 500 continues to step 530 wherein the method 500 determines whether an expiration time period 325 is agreed upon by both terminals (105 and 110). Should an expiration time period 325 not be agreed upon, the method proceeds to step 535 to request consensus between the terminals (105 and 110). Alternatively, a default expiration time period (e.g. zero, 1 day, etc.) may be applied, at which time the method 500 would continue to step 540. In some embodiments, the recording may be played back during the secure communication session 205.

Once consensus is reached, the method 500 then continues to record the communications session 205 at step 540. The method 500 then determines whether the communications session 205 is still active at step 545. Should the session 205 continue to be active, method 500 returns to step 540 wherein the recording is kept in temporary memory 145. However, if the session ends, the method proceeds to step 550 wherein the expiration time period 325 is triggered (at the end of which, the recording in temporary memory is erased). The method then ends at step 555.

Figure 6:
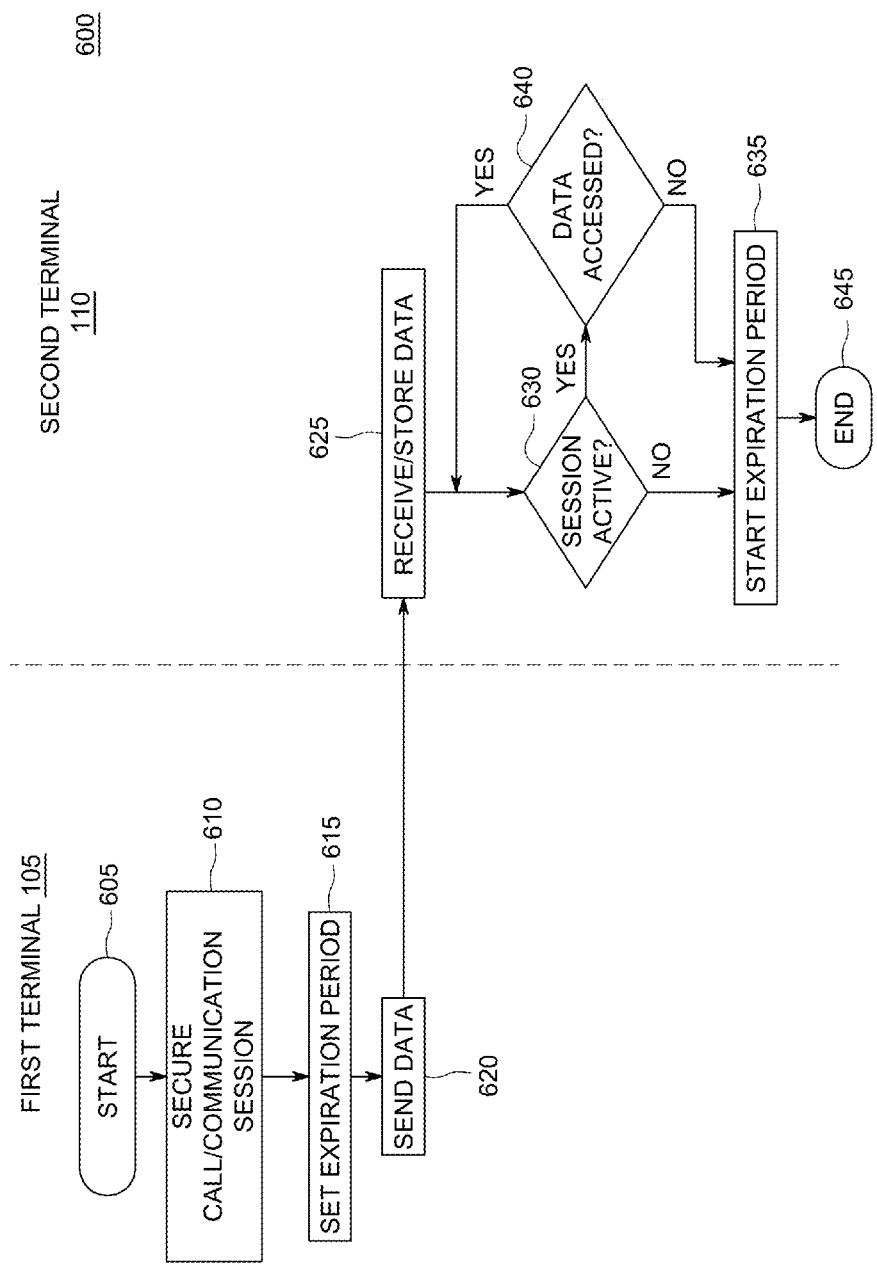
FIG. 6 is a flow diagram of an exemplary temporary storage method in accordance with one or more embodiments of the invention.

FIG. 6 is a flow diagram of an exemplary temporary storage method in accordance with one or more embodiments of the invention and implemented by the devices in FIGS. 1 and 2. The method 600 begins at step 605 and continues with step 610 wherein a secure call/communication session 205 is established and verified between the first terminal 105 and the second terminal 110 across the network 115. Next the first terminal 105 sets an expiration time period 230 associated with secure data 240 at step 615. In some embodiments, the expiration time period 230 may be defaulted to delete immediately. Next, at step 620 the secure data 240 is sent to the second terminal across the network 115. The secure data 240 is then received by the second terminal 110 at step 625 and stored in temporary memory 145 of the second terminal 110.

The method 600 next determines whether the secure call session 205 is active at step 630. If the secure call session 205 is still active, the method 600 determines whether the secure data 240 has been viewed or accessed by the second terminal 110 at step 640. Should the method 600 determine the data has not been viewed, the method 600 may proceed to step 635 and trigger the expiration time period 230 or in some embodiments, immediately delete the secure data 240 from the second terminal 110. However, if the secure data 240 has been accessed the method returns to step 630 to determine if the communications session 205 is still active. Referring back to step 630, if the communications session 205 is inactive/ended the method 600 proceeds to step 635. At step 635 the second terminal 110 begins counting down (e.g. triggers) the expiration time period 230 towards deleting the secure data 240 or alternatively, immediately deletes the secure data 240 and the method ends at step 645. In this manner, the secure data 240 is only available to the second terminal 110 while the secure call session 205 is active and otherwise deleted or set to delete a fixed period of time at the end of the secure call session 205.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method for secure transmission of data during a communication session comprising:
   establishing a secure voice communication session between a first electronic device and second electronic device in a communications network, wherein the communication session uses one of Secure Session Initiation Protocol (SIPS) or secure real-time transfer protocol (SRTP); and
   sending secure data over the established voice communication session using information associated with the established voice communication session, wherein when the secure voice communication session is terminated, the secure data transmitted between the first and second electronic devices is automatically deleted.

2. The method of claim 1, wherein the information includes a pair of security keys to authenticate at least one of the first and second electronic devices prior to sending secure data.

3. The method of claim 1, wherein establishing a secure voice communication session includes encryption and decryption of voice communications by at least one of the first and second electronic devices.

4. The method of claim 1, wherein sending secure data occurs within the same channel as the secure voice communication session.

5. The method of claim 1, further comprising:
   receiving secure data over the established voice communication session using information associated with the established voice communication session.

6. The method of claim 1, wherein the secure data transmitted includes an expiration period that set a time period after which the secure data will be automatically deleted.

7. A method for secure transmission of media during a communication session comprising:
   establishing a secure voice communication session between a first electronic device and second electronic device in a secure voice channel of a first communications network, wherein the communication session uses one of Secure Session Initiation Protocol (SIPS) or secure real-time transfer protocol (SRTP);
   establishing a secure data communication channel between the first electronic device and the second electronic device using information associated with the established voice communication session;
   sending secure data over the established secure data communication channel;
   requesting recording of the secure voice communication session; and generating a temporary recording of the secure voice communication session.

8. The method of claim 7, wherein the secure data communication channel is of a second communications network different from the first communications network.

9. The method of claim 7, further comprising:
receiving secure data over the established secure data communication channel.

10. The method of claim 7, wherein the information includes a pair of security keys to authenticate the first and second electronic devices prior to sending secure data.

11. The method of claim 7, wherein when the secure voice communication session is terminated, the secure data transmitted between the first and second electronic devices is automatically deleted.

12. The method of claim 11, wherein accessing the secure data on at least one of the first and the second devices during the secure voice communication session triggers a beginning of an expiration period.

13. The method of claim 7, wherein the temporary recording is automatically deleted after expiration of a pre-determined time period.

14. A method for automatically deleting data transmitted between a first electronic device and a second electronic device, the method comprising:
establishing a voice communication session between a first electronic device and second electronic device, wherein the communication session uses one of Secure Session Initiation Protocol (SIPS) or secure real-time transfer protocol (SRTP);
establishing a data communication channel between the first electronic device and the second electronic device using information associated with the established voice communication session;
transmitting data over the established data communication channel, wherein the data includes a time period for expiration to automatically delete the transmitted data after termination of the voice communication session; and
deleting the transmitted data after expiration of the time period.

15. The method of claim 14, wherein the time period is set by a user of a device transmitting the data.

16. The method of claim 14, wherein the time period is a default value to immediately delete the transmitted data on at least one of the first or second electronic devices at the end of the voice communications session.

17. The method of claim 14, wherein the time period for expiration begins when the data is accessed.

18. The method of claim 14, wherein the voice communication session and the data communication channel are established as secure communications.

* * * * *